(12) United States Patent
Agnew et al.

(10) Patent No.: US 6,498,984 B2
(45) Date of Patent: *Dec. 24, 2002

(54) LOCATING POSITIONS ON MAPS

(75) Inventors: Hugh John Agnew, West Perth (AU); Gwyn David Walter Parfitt, Jersey (GB)

(73) Assignee: Yeoman Navigation Systems Limited, Hampshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/900,574

(22) Filed: Jul. 6, 2001

(65) Prior Publication Data

US 2002/0002439 A1 Jan. 3, 2002

Related U.S. Application Data

(62) Division of application No. 09/077,118, filed as application No. PCT/GB96/02849 on Nov. 19, 1996, now Pat. No. 6,304,819.

(30) Foreign Application Priority Data

Nov. 21, 1995 (GB) .............................. 95238226

(51) Int. Cl.[7] .......................... G01C 21/00; G06G 7/78
(52) U.S. Cl. ...................... 701/207; 201/208; 201/211; 345/113; 340/990; 340/995
(58) Field of Search ................. 701/207, 208, 701/211, 212, 213; 340/990, 995, 988; 345/113

(56) References Cited

U.S. PATENT DOCUMENTS

| | | | |
|---|---|---|---|
| 3,760,360 A | 9/1973 | Reynolds et al. | 341/34 |
| 4,312,577 A | 1/1982 | Fitzgerald | 353/12 |
| 4,513,377 A | 4/1985 | Hasebe et al. | 701/208 |

(List continued on next page.)

FOREIGN PATENT DOCUMENTS

| | | |
|---|---|---|
| DE | 3801415 | 7/1989 |
| EP | 0382592 | 8/1990 |
| EP | 0389946 | 10/1990 |
| EP | 0559355 | 9/1993 |
| EP | 0597500 | 5/1994 |
| FR | 2695496 | 3/1994 |
| GB | 2043909 | 3/1979 |
| GB | 2191859 | 12/1987 |
| GB | 2272519 | 5/1994 |
| JP | 5-216401 | 8/1993 |
| JP | 2611585 | 2/1997 |
| WO | WO 87 07013 | 11/1987 |
| WO | WO 90-08373 | 7/1990 |
| WO | WO 95 01551 | 1/1995 |
| WO | WO 95 22742 | 8/1995 |

Primary Examiner—Jacques H. Louis-Jacques
(74) Attorney, Agent, or Firm—Gibbons, Del Deo, Dolan, Griffinger & Vecchione

(57) ABSTRACT

An apparatus to enable one's position to be easily found on a traditional map having its own coordinate system distinct from a wide area coordinate system, data is associated with the map from which the relationship—between the map coordinate system and the wide area coordinate system can be determined. The apparatus has a reader for reading the data associated with the map, a memory for storing the read data, a GPS receiver for receiving transmissions from GPS satellites and determining the position of the GPS receiver in terms of the wide area coordinate system, a processor for processing the determined wide area coordinate position and the stored data to determine the position of the GPS receiver in terms of the map coordinate system, and a display or the like for annunciating to a user the determined map coordinate position. The data associated with the map preferably also includes information on the area covered by the map. The map may be one of a series of maps or part of an atlas, the data relating to all of the maps in the series or atlas.

54 Claims, 5 Drawing Sheets

U.S. PATENT DOCUMENTS

| | | |
|---|---|---|
| 4,631,678 A | 12/1986 | Argermuller et al. ........ 701/200 |
| 4,862,374 A | 8/1989 | Ziemann ...................... 701/200 |
| 5,089,816 A | 2/1992 | Holmes, Jr. .................. 340/995 |
| 5,113,178 A | 5/1992 | Yasuda et al. ............... 340/709 |
| 5,268,844 A | 12/1993 | Carver et al. ................ 701/200 |
| 5,278,763 A | 1/1994 | Agnew et al. ............... 701/200 |
| 5,385,371 A | 1/1995 | Izawa .......................... 283/34 |
| 5,422,814 A | 6/1995 | Sprogue et al. .............. 701/213 |
| 5,557,524 A | 9/1996 | Maki ........................... 701/35 |
| 5,566,073 A | 10/1996 | Margolin .................... 701/213 |
| 5,581,259 A | 12/1996 | Schipper ..................... 342/451 |
| 5,596,500 A | 1/1997 | Sprogue et al. .............. 701/213 |
| 5,848,373 A | 12/1998 | DeLorme et al. ........... 701/200 |
| 6,304,819 B1 * | 10/2001 | Agnew et al. ............... 701/207 |

* cited by examiner

LOCATING POSITIONS ON MAPS

This is a divisional of U.S. patent application Ser. No. 09/077,118 filed Jul. 20, 1998, now U.S. Pat. No. 6,304,819 which is a national phase entry from PCT/GB96/02849 filed Nov. 19, 1996.

This invention relates to the location of positions on maps.

Various systems are on the market for facilitating the location of one's position on a map. One example, called the Silva GPS Compass, marketed by Silva Sweden AB, of Sollentuna, Sweden, is a portable device which includes a global positioning system ("GPS") receiver and can display the current position of the receiver in terms of longitude and latitude with an accuracy of about 100 m under the current level of "selective availability" applied by the U.S. Department of Defense who operate GPS. When used with a map having longitude and latitude grid lines, one's position on the map can be located. However, there are two main disadvantages with this system. First, many maps (particularly road and street atlases and steeet plans) do not have any longitude and latitude markings whatsoever. Many other maps (for example British Ordnance Survey ("OSGB") maps), although having longitude and latitude markings around their border and 5 minute graticule markings on the map, do not have any longitude and latitude grid lines drawn across the map. Thus it can be difficult to locate one's position on the map. Second, because longitude and latitude is a global co-ordinate system, much more information is provided by full longitude and latitude co-ordinates than is actually required to locate one's position on a map covering only a minuscule part of the surface area of the planet, and this can lead to confusion. For example, the old UK Patent Office building in Southampton Buildings, off Chancery Lane, London is situated at (51°30'59"N, −0°06'34"E), but it is difficult to locate that position on the relevant map in the OSGB 1:50,000 Landranger Second Series, Sheet 176, which covers latitudes 51°19'N to 51°41'N approximately and longitudes −0°03'E to −0°38'E approximately, but without any longitude and latitude grid lines. Many GPS receivers also produce co-ordinates in various map-grid systems relevant to different countries' mapping systems. The conversion between latitude and longitude and such map-grid systems is made using known and documented algorithms. Throughout this specification, latitude and longitude is therefore used as an example of any wide-area co-ordinate system as hereinafter defined.

A system which deals with some of the above problems is foreshadowed in patent document WO-A-87/07013 and is marketed by Yeoman Marine Limited, of Lymington, Hampshire, United Kingdom, under the name "Navigator's Yeoman". Also, an accessory is available for the Silva GPS compass, called the "Silva Yeoman Navimap", which has a similar effect. These systems use (a) a digitising table on which a traditional map can be placed, (b) a cursor which is movable across the map on the table and has indicators to indicate a required direction of movement, (c) a GPS receiver (or an input to receive a signal from a separate GPS receiver) from which one's current position can be determined, and (d) a processor which determines, from the cursor position on the digitising table and the current GPS position, which way the cursor should be moved so that it is over the current position and activates the indicator lights on the cursor accordingly. Whilst this system has the advantages that it can be used with any traditional map to any scale and of any part of the world, and one's current position can be located by following the indicators rather than thinking in terms of latitude and longitude, it does suffer from two disadvantages. First, before it can be used, the map must be manually referenced with respect to the digitising table so that the processor can translate between the latitude and longitude co-ordinates obtained from the GPS receiver and the co-ordinates of the digitiser table. Referencing can be performed by placing the cursor at two (and preferably three) positions on the chart, and at each position instructing the processor with the latitude and longitude co-ordinates of that position. Alternatively, when used for relative, rather than absolute, positioning when one's current position on the map is known, referencing can be carried out by registering the cursor on the current known position on map and then indicating to the apparatus the north direction of the map and its scale. Second, it requires the use of a digitising table which is as large as the map, or at least as large as a folded portion of the map which is to be viewed at one time without re-referencing.

Another apparatus which deals with this problem is described in patent document WO-A-95/22742, in which a paper map is placed behind a transparent liquid crystal display which can cover the whole area of the map. The map has a mark, for example in the form of a bar code, which can be read by the apparatus and used to correlate positions on the map with latitude and longitude positions. The apparatus also includes a GPS receiver, and the current position obtained from the receiver is converted into a map position, which is then indicated on the LCD by a graphic image, such as crosshairs, to show the current position on the map. However, this apparatus suffers from a number of disadvantages. First, a liquid crystal graphic display is required which is as large as the map, which is thus expensive, cumbersome and liable to be damaged. Second, it is necessary for the map to be used opened out, and the apparatus cannot apparently deal with folded maps. Third, the apparatus can apparently be used only with single sheet maps.

One solution to these problems is to "computerise" the map. In the SkyMap system marketed by Skyforce Avionics Limited of Ramsgate, Kent, United Kingdom, which is primarily designed for aircraft navigation, a representation of the map is held in computer memory. The current position is determined using a GPS receiver, and a relevant part of the map, together with the current position, is displayed on a liquid crystal graphic display. The disadvantages of this sort of system are that (a) it would be extremely expensive if a large, high-resolution, map and colour display were to be used; and (b) many people prefer to use a traditional map. The SkyMap system also has the ability to display the full OSGB grid co-ordinates of the current position so that the position can be located on an OSGB map. However, OSGB maps are not indexed according to the grid reference covered, only according to sheet numbers, and the sheet numbers depend on the scale and series of the maps. Therefore it is not straightforward to select the appropriate map. Also, for a resolution of 100 m, the full eight digit (or two letter and six digit) OSGB grid reference is not needed and not normally used when referring to a particular 1:50, 000 sheet, and therefore providing all eight digits can lead to unnecessary confusion.

The present invention is concerned with dealing with the problems mentioned above of the known systems.

In this specification, the following terms are intended to have the following meanings: "Traditional map" means a map which is printed on paper, linen, plastics sheet or the like: "Map co-ordinate system" means a system of co-ordinates which are normally used to define a position on a particular map, and differs from a "Wide-area co-ordinate system" which includes the longitude and latitude system for defining positions on the earth's surface, but also includes other co-ordinate systems. For example, when considering a single map in the OSGB 1:50,000 series, for instance Sheet 176 mentioned above, the co-ordinates (312, 815) are co-ordinates according to the map co-ordinate system for that map, and differ not only from the co-ordinates (51.5164°N, −0.1095°E) according to the longitude and latitude co-ordinate system but also from the full OSGB co-ordinates (5312, 1815) or (TQ, 312, 815) according to the complete wide-area OSGB coordinate system; and "Wide-area position transmitting system" means a system which transmits signals which can be received over a large area and which can be processed so as to determine the receiver's position in terms of a wide-area co-ordinate system. An example of a wide-area position transmitting system is "GPS", which is operated by the U.S. Department of Defense and comprises a couple of dozen or so transmitters which orbit the earth and transmit signals. When the signals from three or more transmitters are being received at a single site, they can be processed so as to determine the position of that site in terms of longitude and latitude. However, the term "wide-area position transmitting system" is intended to include not only other satellite positioning systems, but also terrestrial positioning systems which rely on transmissions from land-based transmitters, and from which one's position in terms of a wide-area co-ordinate system can be determined.

SUMMARY OF THE INVENTION

First and second aspects of the invention are concerned in particular with a position locating apparatus, for use with a traditional map having its own co-ordinate system distinct from a wide-area co-ordinate system and for use with conversion data associated with the map (e.g. in the form of a bar code, magnetic stripe, smart card or encoded text) from which the relationship between the map co-ordinate system and the wide-area co-ordinate system can be determined, the apparatus comprising: means for receiving the conversion data; means for receiving transmissions from a wide-area position transmitting system and determining therefrom the current position of the transmission receiving means in terms of the wide-area coordinate system; means for processing the current wide-area co-ordinate position and the conversion data to determine the current position in terms of the map co-ordinate system: and means (e.g. a display or speech synthesiser) for annunciating to a user the current map co-ordinate position. Such a system is disclosed in WO-95/22742 mentioned above.

The first aspect of the invention is characterised in that: the processing means is operable to determine the current map co-ordinate position as a coarse position relative to the map and a fine position relative to the coarse position; and the annunciating means comprises means for annunciating the coarse position and means for annunciating the fine position.

The aspect of the invention therefore provides the advantage that a form of annunciation which is suitable for coarse positioning can be used for that purpose, and another form of annunciation which is suitable for fine positioning can be used for that purpose.

In one embodiment for use with such a map which is divided up into an array of blocks, the coarse position annunciating means is preferably operable to annunciate an identity of that one of the blocks containing the current position, as in the above example "Block M 42".

For annunciating the fine position, each block could, for example, be notionally divided in ten in each of the x and y directions, and the location of the old Patent Office building could be annunciated as "Page 62, Block M 42, Position (1, 7)". However, this may cause confusion, for example as to whether it means 1/10 along and 7/10 up, or 1/10 up and 7/10 along. To deal with this, and the fine position annunciating means preferably comprises a graphical display and means for activating the display to display the fine position relative to a datum point. Preferably, the display comprises a see-through display which can be registered over the identified block on the map and which is operated to indicate the current position within that block. Accordingly, the display need only be as large as a block on the map, and need not be as large as the whole map.

The apparatus may be used with such conversion data from which the area covered by the map can be determined, and in this case the processing means is preferably operable to determine whether the current position is covered by the map. In this way, invalid or inappropriate annunciations, which might confuse the user, can be avoided.

The apparatus may be used with a series of such maps and with such conversion data from which the relationship between the co-ordinate system(s) of the maps and the wide-area co-ordinate system can be determined and the area covered by each map can be determined. In this case, preferably the processing means is operable to determine (a) the identity of that map, or at least one of those maps, which cover the current position, and (b) the current position on that map in terms of the co-ordinate system of that map; and the annunciating means is operable to annunciate to the user (a) the identity of that map and (b) the current position in terms of the co-ordinate system of that map. Thus, the user can be assisted in selecting the appropriate map. Thus, for example, in the case of the OSGB 1:50,000 Landranger Second Series, the data for all two hundred and four sheets in the series may be stored, and in the case of the position mentioned above, the annunciation may be in the form "Sheet 176, grid block (31, 81)."

This latter feature may be provided in an apparatus which does not possess the other features of the first aspect of the invention. Accordingly, the second aspect of the invention is characterised in that: the apparatus is for use with a series of such maps and for use with such conversion data from which the relationship between the co-ordinate system(s) of the maps and the wide-area co-ordinate system can be determined and the area covered by each map can be determined; the processing means is operable to determine (a) the identity of that map, or at least one of those maps, which cover the current position, and (b) the current position on that map in terms of the co-ordinate system of that map; and the annunciating means is operable to annunciate to the user (a) the identity of that map and (b) the current position in terms of the co-ordinate position of that map.

The apparatus may be used with such maps having some portions which overlap, and in this case preferably the processing mans is operable, in the case of a position falling on more than one of the maps, to determine (a) the identity of two or more of the maps which cover the current position, and (b) the current position(s) on those maps in terms of the co-ordinate system(s) of those maps; and the annunciating means is operable to annunciate to the user (a) the identities of those maps and (b) each current position in terms of the co-ordinate system of the respective map. Thus, when used with an atlas, for example, the apparatus does not force the user to turn a page when that may not be necessary.

The apparatus may be used with such maps which are not all to the same scale and with such conversion data which takes into account the different scales of the maps, and in this case preferably the processing means is operable to take into account the scale of the maps in determining the current position in terms of the map co-ordinate system(s). For example, the Geographers' A-Z Master Atlas of Greater London, Edition 4(B), has a first set of maps on pages 2 to 160 covering Greater London to a scale of 3" to 1 mile (1:21,120), a second set of maps on pages 162 to 183 covering central London to a larger scale of 9" to 1 mile (1:7,040) and a third set of maps covering London and its environs to a smaller scale of 2½ miles to 1" (1:158,400). The site of the old UK Patent Office building off Chancery Lane is covered by all three sets of maps, on pages 62, 173 and 186, as shown in FIGS. 1, 2 and 3, respectively, of the accompanying drawings. In accordance with this feature of the invention, the position of that building could be annunciated as "Page 62, Block M 42", "Page 173, Block G 2" and "Page 186, Block (30, 80)", simultaneously, or one after another.

The apparatus may be used with such conversion data from which the relationship between the map co-ordinate system and at least one datum point of the medium on which the map is formed can he determined, and in this case one embodiment of the apparatus tier includes: a digitising surface having its own co-ordinate system means for referencing the map with respect to the digitising surface; a cursor which is movable with respect to the referenced map and the digitising surface; means for determining the position of the cursor with respect to the digitising surface in terms of the digitising surface's co-ordinate system; means for processing the current wide-area co-ordinate position and the conversion data to determine the current position in terms of the digitising surface's co-ordinate system and/or for processing the cursor position and the conversion data to determine the cursor position in terms of the wide-area co-ordinate system; and means for annunciating to a user the current position in terms of the digitising surface co-ordinate system and/or the cursor position in terms of the wide-area co-ordinate system; wherein the referencing means comprises means for registering the or each datum point of the map medium with respect to the digitising surface.

These latter features may be provided in an apparatus which does not possess the other features of the first and second aspects of the invention. Accordingly, a third aspect of the present invention is concerned with a position locating apparatus, for use with a traditional map having its own co-ordinate system distinct from a wide-area co-ordinate system and for use with conversion data associated with the map from which the relationship between the map co-ordinate system and the wide-area co-ordinate system can be determined, the apparatus comprising: a digitising surface having its own co-ornate system; means for referencing the map with respect to the digitising surface; a cursor which is movable with respect to the referenced map and the digitising surface; means for determining the position of the cursor with respect to the digitising surface in terms of the digitising surface's co-ordinate system; means for receiving the conversion data; means for receiving transmissions from a wide-area position transmitting system and determining therefrom the current position of the transmission receiving means in terms of the wide-area co-ordinate system; means for processing the current wide-area co-ordinate position and the conversion data to determine the current position in terms of the digitising surface's co-ordinate system and/or for processing the cursor position and the conversion data to determine the cursor position in terms of the wide-area co-ordinate system; and means for annunciating to a user the current position in terms of the digitising surface co-ordinate system and/or the cursor position in terms of the wide-area co-ordinate system. Such an apparatus is known from WO-A-87/07013 mentioned above. The third aspect of the invention is characterised in that: the apparatus is for use with such conversion data from which the relationship been the map co-ordinate system and at least one datum point of the medium on which the map is formed can be determined; and the referencing means comprises means for registering the or each datum point of the map medium with respect to the digitising surface. Thus, by making use of the conversion data and the registering means, referencing of the map with respect to the digitising surface can be greatly facilitated.

Preferably, the annunciating means is operable to annunciate the current position by indicating a required direction of movement of the cursor towards that position. Also, preferably, storing means is provided for storing a target position; the processing means is also operable to calculate the distance between the stored position and the current position and/or the bearing of the stored and current positions relative to each other; and the annunciating means is also operable to annunciate the calculated distance and/or bearing.

A fourth aspect of the present invention is concerned with a map having: its own co-ordinate system distinct from a wide-area co-ordinate system; and conversion data associated therewith from which the relationship between the co-ordinate system of the map and a wide-area co-ordinate system can be determined. As will be appreciated from the above, such a map is known from WO-A-95/22742. The fourth aspect of the invention is characterised in that: the map is one of a series of such maps; and the conversion data is collectively provided for all of the maps in the series. Accordingly the maps can be used in a system which can indicate to the user which of the maps to use.

Preferably, the area covered by each map can be determined from the conversion data. Some portions of the maps may overlap. Not all of the maps need be to the same scale, and in this case the conversion data preferably takes into account the different scales of the maps. The maps in the series may be bound together in the form of an atlas. When used with the apparatus described above, the apparatus can then tell the user to which page of the atlas to turn, and where on that page to look. The conversion data may be provided on or in the maps or atlas, for example in the form of a bar code or magnetic stripe printed on the map or inside cover of the atlas, or a smart card forming an additional page to the atlas, or which is removably inserted in a pocket or the like on the map or in the atlas. The conversion data includes at least one parameter related to the cartographic projection(s) of the maps, so that the system can accurately locate positions on maps employing different cartographic projections. In one embodiment, the conversion data is machine-readable, and the data receiving means of the apparatus may then comprise means for reading the machine-readable data. Alternatively, the conversion data may be provided as user-readable encoded text, and the data receiving means of the apparatus may then comprise means (such as a keypad) to enable a user to enter the encoded text and means for decoding the entered text.

A fifth aspect of the present invention provides a position locating system, comprising: an apparatus according to any of the first to third aspects of the invention; a traditional map having its own co-ordinate system distinct from a wide-area co-ordinate system; and conversion data associated with the map from which the relationship between the map co-ordinate system and the wide-area co-ordinate system can be determined.

A sixth aspect of the present invention provides a position locating system, comprising: an apparatus according to any of the first to third aspects of the invention; and a series of maps and associated data according to the fourth aspect of the invention.

In the fifth or sixth aspect of the invention, when the fine position annunciating means comprises a graphical display, the display is preferably substantially smaller in area than the or each map.

In accordance with a seventh aspect of the present invention, there is provided a data carrier per se associated with a series of maps and containing data from which the relationship between the co-ordinate system(s) of the map and the wide-area co-ordinate system can be determined, the data being machine-readable or being encoded user-readable text.

It may be appreciated from the above that at least certain embodiments of the invention provide the advantages over the known systems described above that; (1) there is no need for a digitising surface or the like, although in one version of the invention a digitising surface may be employed; (2) there is no need for a graphics display which is as large as the map; (3) traditional maps can be used, the only requirement being the additional data associated with the map, this being possible at low cost; (4) the user does not have any difficulty in selecting the appropriate map; (5) the user does not need to concern themself with latitude and longitude, but instead coordinate data is provided which is more relevant to the map being used. Using the example given above, instead of (or in addition to) being presented with the latitude and longitude co-ordinates (51°30′59″N, −0°06′34″E), the user might instead be presented with the abbreviated OSGB grid block for the position on Sheet 176, i.e. "(31, 81)" or with the abbreviated higher resolution grid reference "(312, 815) "; and (6) referencing is carried out simply by entering the data associated with the map.

BRIEF DESCRIPTION OF THE DRAWING

A specific embodiment of the invention and some modifications and developments thereto will now be described by way of example with reference to the accompanying drawings, in which.

DETAILED DESCRIPTION OF THE INVENTION

Figure 1:
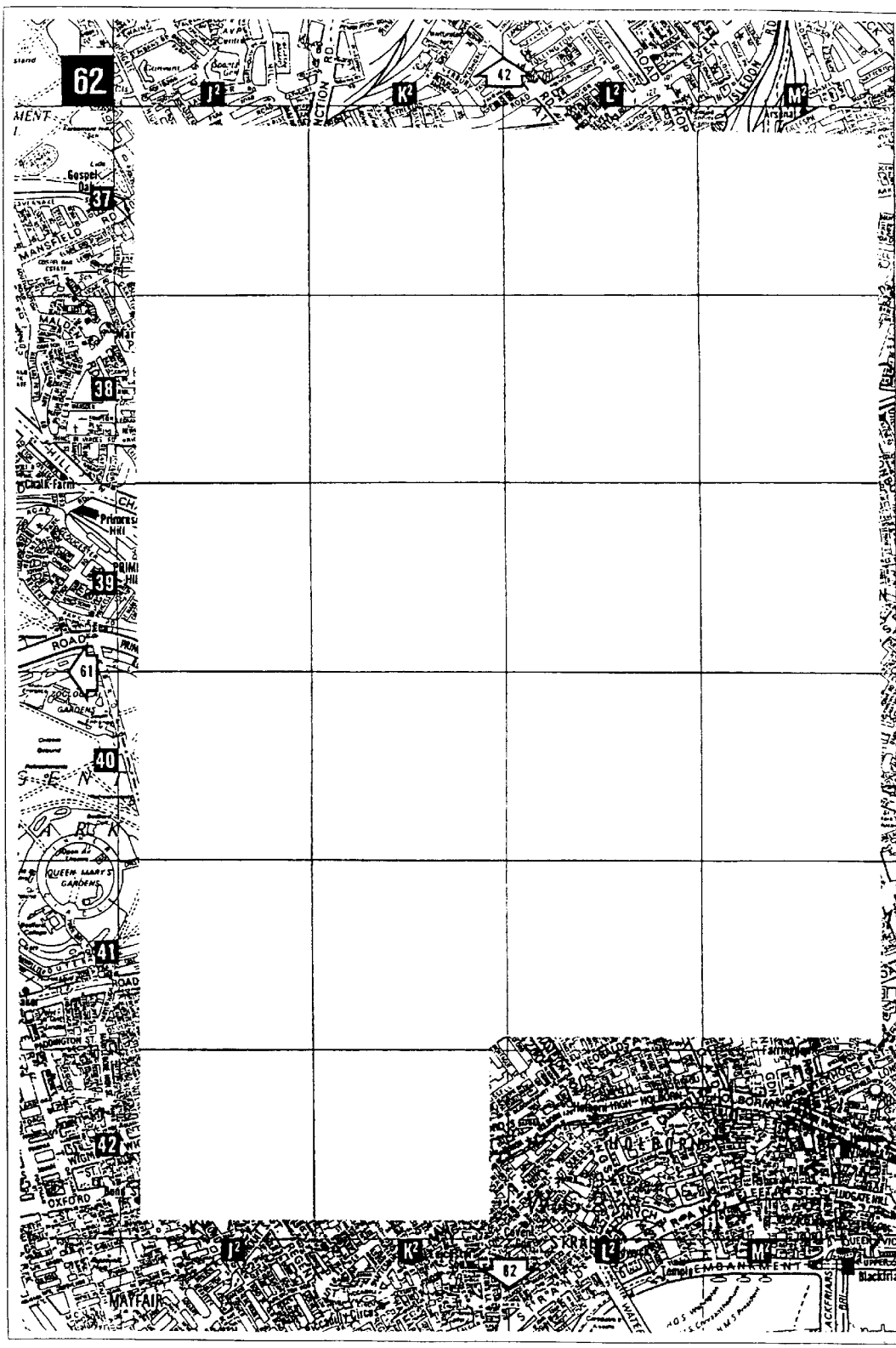
FIGS. 1–3 show portions of pages 62, 173 and 186, respectively, of the Master Atlas of Greater London, Edition 4(B), published by Geographers' A-Z Map Company Limited, Sevenoaks, Kent.

Conversion of Wide-area Co-ordinates to Map Co-ordinates

In the remainder of this description: θ and φ denote the wide area co-ordinates of a position on the surface of the earth in terms of longitude (θ) and latitude (φ) with the sign convention that east of the Greenwich meridian is positive and north of the equator is positive; ψ denotes the product of the longitude and the cosine of the latitude of a position on the surface of the earth, i.e.:

$$\psi = \theta \cdot \cos \phi \qquad (1)$$

and x and y denote coordinates (in the usual directions) of a position on a map in terms of the map's own co-ordinate system.

In the apparatus of the embodiments, is necessary to convert from (θ, φ) to (x, y). In a simplistic "flat-earth" model for maps covering a small part of the earth's surface, it can be assumed that, for a particular map, x and y are each linear functions of ψ (=θ.cos φ) and φ, i.e.:

$$(x \ y) = (\psi \ \phi \ 1) \cdot \begin{pmatrix} a & b \\ c & d \\ e & f \end{pmatrix} \qquad (2)$$

Assuming that the x direction of the map is approximately parallel to the lines of latitude, then in the conversion matrix above, the elements a and d relate predominantly to the scale of the map in the x and y directions, the elements e and f relate predominantly to the position of the map, and the elements b and c account for any skew between the x direction of the map and the lines of latitude. By taking the wide-area co-ordinates $(\theta_1, \phi_1)$, $(\theta_2, \phi_2)$, $(\theta_3, \phi_3)$ of three positions on the surface of the earth and by taking the map co-ordinates $(x_1, y_1)$, $(x_2, y_2)$, $(x_3, y_3)$ of the corresponding three positions on a particular map, it is possible to formulate six simultaneous equations derived from Formula 2 which can be represented by:

$$\begin{pmatrix} x_1 & y_1 \\ x_2 & y_2 \\ x_3 & y_3 \end{pmatrix} = \begin{pmatrix} \psi_1 & \phi_1 & 1 \\ \psi_2 & \phi_2 & 1 \\ \psi_3 & \phi_3 & 1 \end{pmatrix} \begin{pmatrix} a & b \\ c & d \\ e & f \end{pmatrix} \qquad (3)$$

These simultaneous equations can then be solved to obtain the unknown values a to f of the conversion matrix by multiplying both sides by the inverse of the matrix containing the wide-area co-ordinates:

$$\begin{pmatrix} a & b \\ c & d \\ e & f \end{pmatrix} = \begin{pmatrix} \psi_1 & \phi_1 & 1 \\ \psi_2 & \phi_2 & 1 \\ \psi_3 & \phi_3 & 1 \end{pmatrix}^{-1} \cdot \begin{pmatrix} x_1 & y_1 \\ x_2 & y_2 \\ x_3 & y_3 \end{pmatrix} \qquad (4)$$

$$\therefore \begin{pmatrix} a & b \\ c & d \\ e & f \end{pmatrix} = \frac{\begin{pmatrix} \phi_2 - \phi_3 & \phi_3 - \phi_1 & \phi_1 - \phi_2 \\ \psi_3 - \psi_2 & \psi_1 - \psi_3 & \psi_2 - \psi_1 \\ \psi_2 \phi_3 - \psi_3 \phi_2 & \psi_3 \phi_1 - \psi_1 \phi_3 & \psi_1 \phi_2 - \psi_2 \phi_1 \end{pmatrix} \cdot \begin{pmatrix} x_1 & y_1 \\ x_2 & y_2 \\ x_3 & y_3 \end{pmatrix}}{(\psi_1 \ \psi_2 \ \psi_3) \cdot \begin{pmatrix} \phi_2 - \phi_3 \\ \phi_3 - \phi_1 \\ \phi_1 - \phi_2 \end{pmatrix}} \qquad (5)$$

As an example, considering the above-mentioned OSGB map sheet 176, and taking the three positions as the bottom-left corner, bottom right corner and the midpoint along the top edge of the map, this gives:

$(x_1, y_1)=(495 \text{ km}, 160 \text{ km})$ $(\theta_1, \phi_1)=(-0.6367°, 51.3308°) \therefore \psi_1=-0.39782°$ $(x_2, y_2)=(535 \text{ km}, 160 \text{ km})$ $(\theta_2, \phi_2)=(-0.0628°, 51.3225°) \therefore \psi_2=-0.03925°$ $(x_3, y_3)=(515 \text{ km}, 200 \text{ km})$ $(\theta_3, \phi_3)=(-0.3358°, 51.6860°) \therefore \psi_3=-0.20819°$ $$\begin{pmatrix} a & b \\ c & d \\ e & f \end{pmatrix} = \begin{pmatrix} 111.47994 \text{ km/}° & 2.574881 \text{ km/}° \\ -3.2092944 \text{ km/}° & 111.23796 \text{ km/}° \\ 704.10065 \text{ km/}° & -5548.9032 \text{ km/}° \end{pmatrix} \quad (6)$$

To evaluate the accuracy of conversion, the wide-area co-ordinates for the other two corners of sheet 176 are $(\theta_4, \phi_4) = (-0.6250°, 51.6903°)$ and therefore $\psi_4 = -0.38744°$ at the top-left corner and $(\theta_5, \phi_5) = (-0.0464°, 51.6817°)$ and therefore $\psi_5 = -0.02877°$ at the top-right corner. Applying the conversion formula 2 using the conversion matrix of formula 6 for sheet 176 gives map co-ordinates $(x_4, y_4) = (495.019 \text{ km}, 200.023 \text{ km})$ and $(x_5, y_5) = (535.032 \text{ km}, 199.990 \text{ km})$. On the map, the co-ordinates of these two corners are, in fact, (495 km, 200 km) and (535 km, 200 km), and thus there are discrepancies of:

$$\sqrt{((495.019-495)^2+(200.023-200)^2)} \text{ km} = 30 \text{ m};$$

and $$\sqrt{((535.032-535)^2+(199.990-200)^2)} \text{ km} = 34 \text{ m}$$

which are less than the inccuracy provided by GPS and therefore not a limiting factor. On the paper of the map, the discrepancies are 1/50,000 of these amounts, that is 0.60 mm and 0.68 mm, respectively.

Testing whether a Position is within the Boundary of a Map

When the invention is applied to a single map, it is preferable that a determination is made as to whether the current position is within the boundary of the map, so as to avoid attempting to calculate and annunciate map coordinates which are not covered by the map. Also, when the invention is applied to a series of maps, it is preferable that a determination is made as to whether the current position is within the boundary of any of the maps, and if so which one(s). Due to the nature of the longitude and latitude wide-area co-ordinate system, relatively few maps have boundaries which extend along lines of constant longitude or constant latitude. It would be possible to develop a formula defining each boundary line in terms of both longitude and latitude. However, the invention preferably takes advantage of the fact that the majority of maps are square or rectangular and their boundaries run parallel and at right angles to the map's co-ordinate system. Accordingly, it will be appreciated, from formula 2, that if the co-ordinates of the bottom-left and top-right corners of a map are $(x_L, y_B)$ and $(x_R, y_T)$, respectively, then a position having wide-area co-ordinals $(\theta, \phi)$ and accordingly a value $\psi = \theta \cdot \cos \phi$ will fall on the map if it satisfies both of the relationships:

$$x_L \leq a\psi + c\phi + e \leq x_R \quad (7)$$

$$y_B \leq b\psi + d\phi + f \leq y_T \quad (8)$$

Thus, given the wide-area co-ordinates $(\theta, \phi)$ of a position, the values a to f of the conversion matrix for a particular map, and the co-ordinates $(x_L, y_B)$ and $(x_R, y_T)$ in terms of the map's co-ordinate system of two, diagonally-opposite corners of the map, it is simple to test whether that position falls on that map.

The mapped region of some maps is not a simple rectangle or square. For example, maps often have a small legend rectangle at one corner. In this case, the mapped area can be divided up into, say, two rectangular sub-tnaps, each having the same conversion matrix, but with different values of $x_L$, $x_R$, $y_T$ and $y_B$.

Different Co-ordinate Styles

Figure 2:
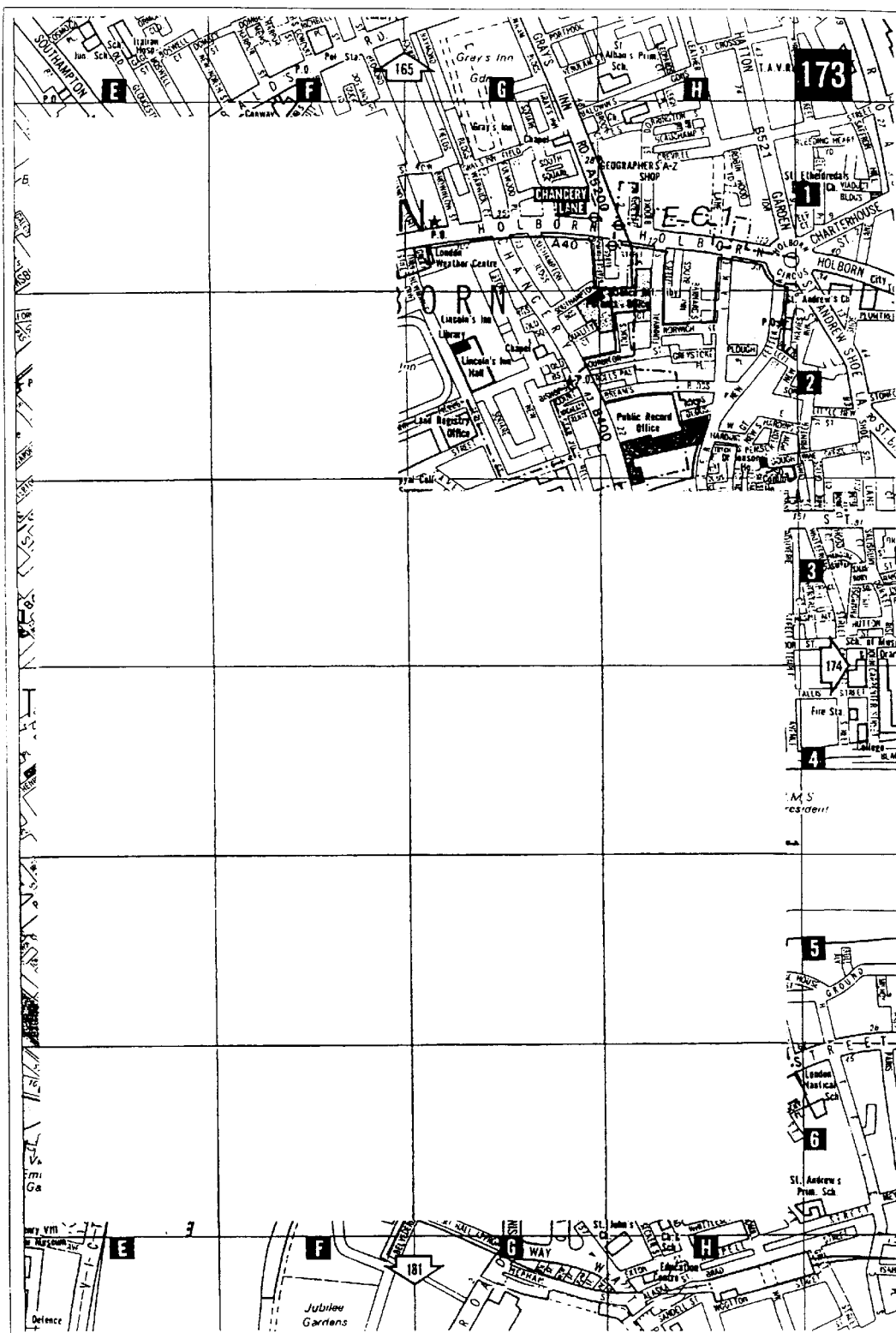
Figure 3:
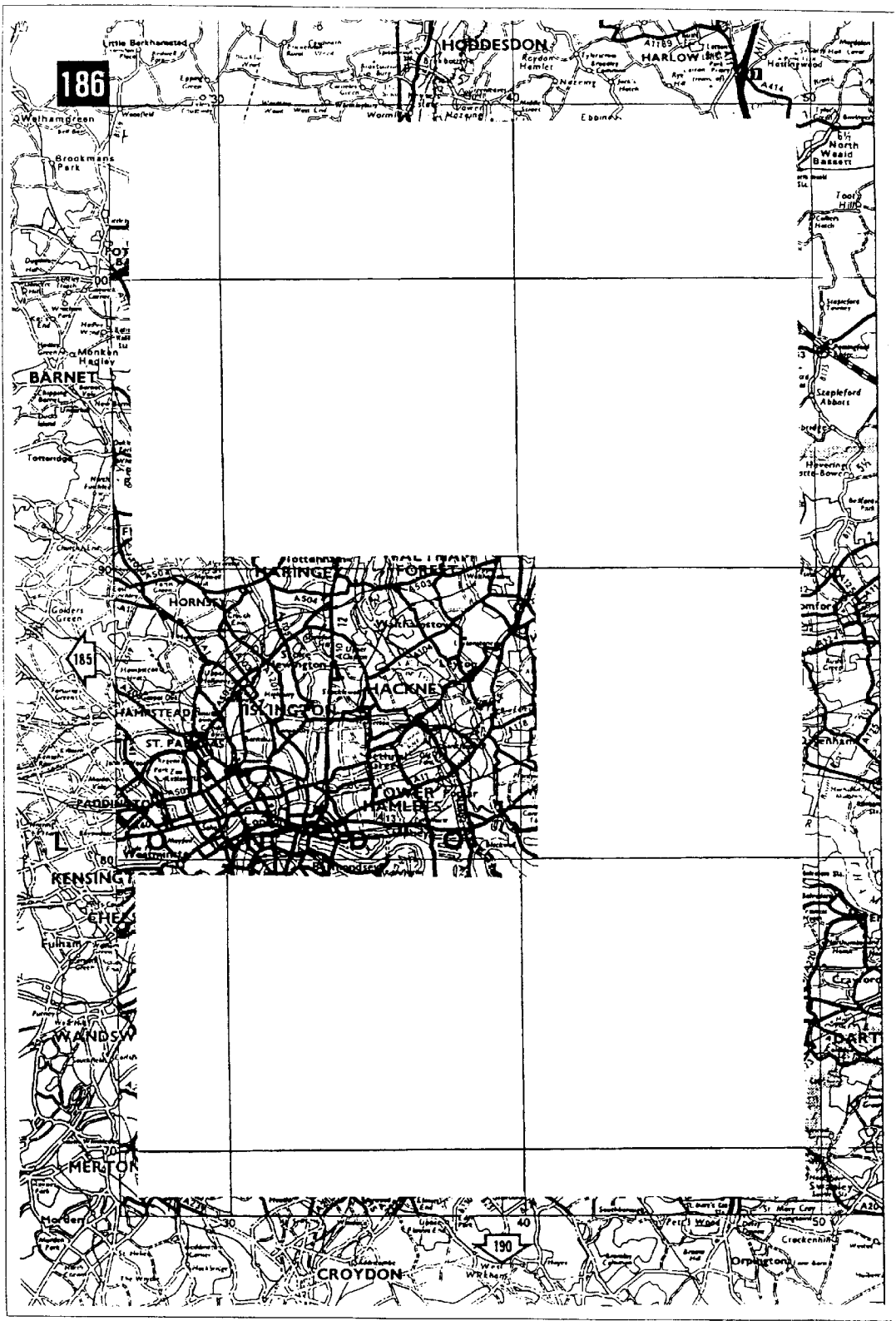

It will be appreciated that different maps have different styles for representing their co-ordinates. For example, the co-ordinates of the grid lines on most OSGB sheets, in each of the x and y directions, consist in full of a three digit number, e.g. the old Patent Office site mentioned above is in OSGB grid block (31, 81), but the most significant digits are not normally used and are usually marked only at the corners of the map. In the first set of maps in the A-Z Master Atlas of Greater London mentioned above, the y co-ordinates of the map blocks are numerical but increasing in the downwards direction, as seen in FIG. 1, and the x co-ordinates are alphabetical with repeats, but the same letter is never repeated on two adjacent pages of the atlas. As shown in FIG. 2, in the second set of maps of that atlas, the x co-ordinates of the map blocks are alphabetical, but re-starting at "A" on each double page. As shown in FIG. 3, the third set of maps are marked with OSGB grid lines at 10 km intervals. In the embodiment of the invention, all map co-ordinates (x, y) are stored and processed numerically until they are displayed, when they are converted into their proper form (X, Y) in dependence upon co-ordinate style codes $S_x$ and $S_y$ for the map or set of maps in question.

The Data Associated with a Map or Maps

In the case of a single map, the data which is provided may comprise: a "single map" flag set at 1 indicating that the data relates to a single map; the six values a to f of the conversion matrix; the four values $x_L$, $x_R$, $y_T$ and $y_B$ defining the map's boundaries; two codes $S_x$, $S_y$ representing the x and y co-ordinate styles of the map; and the name of the map.

In the example given above, the data night consist of: 111.47994; 2.574881; −3.2092944; 111.23796; 704.10065; −5548.9032; 495; 535; 160; 200; $S_x$; $S_y$; "OSGB Landranger Series 2 Sheet 176".

The eleven data items may be printed in the form of a bar code or magnetic stripe on the map.

In the case of a series of maps, the data which is provided may comprise:

the single map flag, but set to 0 indicating that the data relates to more than one map;

the name of the series of maps or the atlas (e.g. "A-Z Master Atlas Greater London");

the number S of sets of maps in the series or atlas (e.g. "3");

{for each set of the S sets:-}
  two codes representing the x and y co-ordinate styles of the maps in that set;
  the number M of maps in that set;
  {for each map in that set:-}
    the name of that map (e.g. "Page 62");
    the six values a to f of the conversion matrix for that map; and
    the four values $x_L$, $x_R$, $y_T$ and $y_B$ defining that map's boundaries.
  {next map}
{next set}

Construction of the Apparatus

Figure 4:
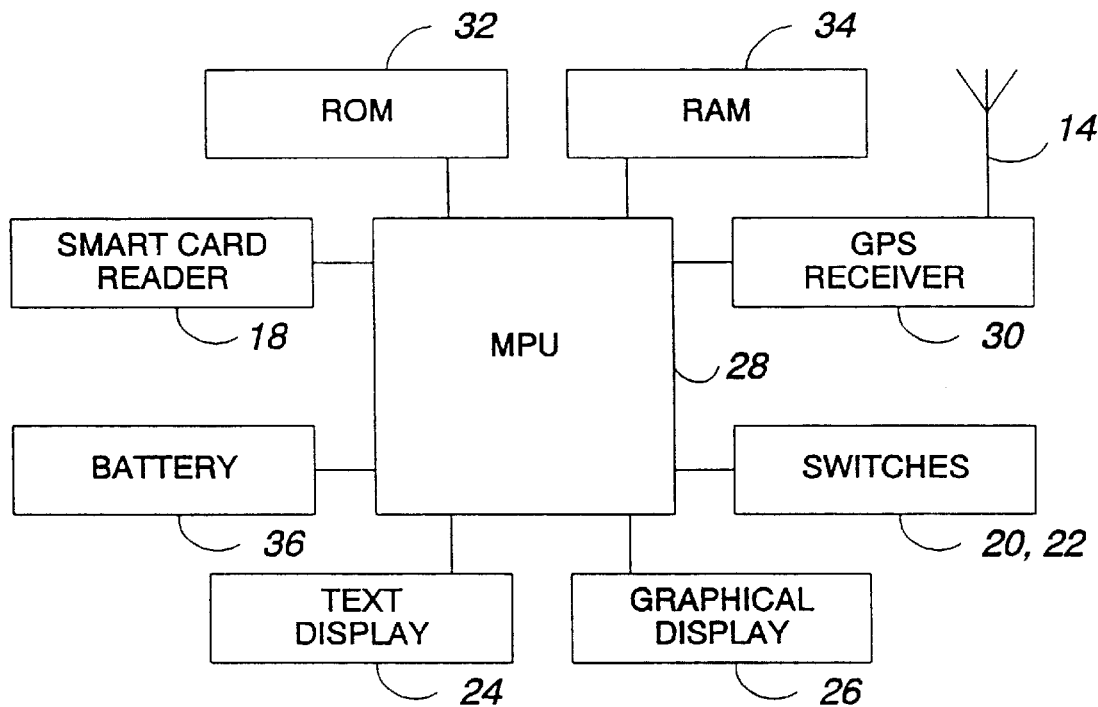
FIG. 4 is a block diagram showing functional elements of one embodiment of apparatus for use in performing the invention.
Figure 5:
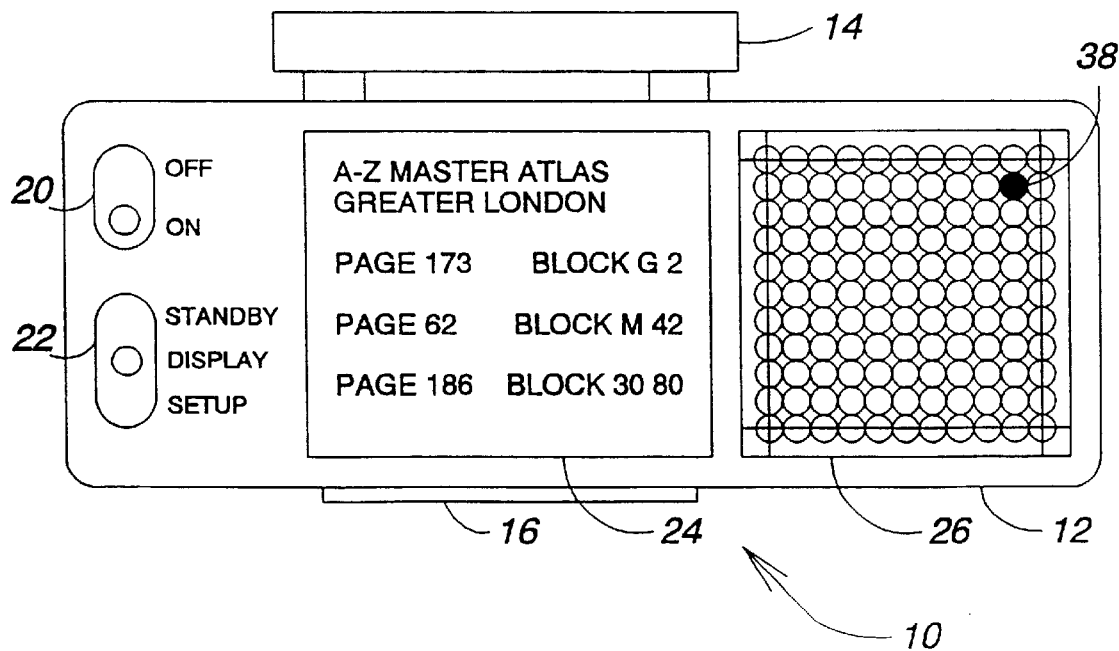
FIG. 5 is top view of the apparatus of FIG. 4.

Referring to FIGS. 4 and 5, the apparatus 10 is portable, of so called "palm-top" size, and comprises a casing 12 having a GPS antenna 14 mounted on its top edge and a slot 16 providing access to a smart card reader 18 in its bottom edge. The smart card may form part of a special page of an atlas, or may be removably inserted in a pocket inside the cover of the atlas. Alternatively, the smart card which is insertable into the slot 16 may be a completely separate article, for example containing the data of all 204 sheets in the OSGB Landranger Second Series. The top face of the casing 12 has: an on/off switch 20; a mode switch 22 having standby, display and setup positions; a liquid crystal text display 24; and a liquid crystal graphical display 26. Alternatively, these two displays could be combined into one. The graphical display 24 comprises an 11×11 array of pixels, any one 38 of which can be activated to display a position within a grid block.

Referring in particular to FIG. 4, the casing also contains: a microprocessor unit 28; a GPS receiver 30; ROM 32; RAM 34; and a battery 36. An external power socket may also be provided to receive power from a mains adaptor to charge the battery or from a vehicle's cigar lighter socket.

Operation of the Apparatus

When the on/off switch 20 is "on", the MPU 28 operates in accordance with a program stored in the ROM 32. When the mode switch 22 is at "setup", the smart card reader 18 is activated, and it can read the data mentioned above associated with the map, series of maps or atlas, and supply it to the MPU 28 for processing and storage in the RAM 34. The GPS receiver 30 is connected to the GPS antenna 14, and when the mode switch 22 is at "display", the GPS receiver 30 is activated, and when it receives signals from three or more GPS satellites it supplies the current wide-area co-ordinates ($\theta$, $\phi$) to the MPU. When the mode switch 22 is at "display" or "setup", the LCDs 24, 26 are activated. When the mode switch 22 is at "standby", the smart-card reader 18, GPS receiver 30 and LCDs 24, 26 are inactive, but the data which has been read continues to be stored in the RAM 34.

The program stored in the ROM 32 causes the apparatus to operate according to the following routines of steps while the on/off switch is "on":

Main Routine

R1 Set to 0 a "data present" flag F indicating whether data associated with a map has been read.

R2 If the mode switch 22 is at "display" jump to step R5, or if at "setup" call the Setup subroutine, otherwise if the mode switch 22 is at "standby" continue.

R3 If the displays 24, 26 are on, or the GPS receiver 30 is on, switch them off.

R4 Loop back to step R2.

R5 If the data present flag F is 0, activate the text display 24 to invite the user to switch to "setup" and loop back to step R2, otherwise continue.

R6 If the GPS receiver 30 is off, switch it on.

R7 If the GPS receiver 30 is not producing wide-area co-ordinate signals, activate the text display 24 to inform the user that the GPS position is awaited and loop back to step R2, otherwise continue.

R8 Store the wide-area co-ordinates ($\theta$, $\phi$) from the GPS receiver 30 in the RAM 34.

R9 From the stored wide-area co-ordinates ($\theta$, $\phi$) and Formula 1, calculate the value of $\psi$ and store it in the RAM 34.

R10 If the single map flag in the read data is 1, call the Single Calculation subroutine, otherwise call the Multi Calculation subroutine.

R11 Loop back to step R2.

Setup Subroutine

S1 Switch on the smart card reader.

S2 Activate the text display 24 to invite the user to insert the smart card associated with the map, series of maps, or atlas to be used.

S3 Loop on this step until data has successfully been read, and then continue.

S4 Store the read data in the RAM 34.

S5 Switch off the smart card reader.

S6 Set the data present flag to 1.

S7 Activate the text display 24 to inform the user of the name of the map, series of maps or atlas, and that the data has been successfully read.

S8 If the mode switch is at "setup", loop on this step, otherwise continue.

S9 Return to the main routine.

Single Calculation Subroutine

C1 If, from Formulae 7 and 8 and the stored data, it is determined that the current position is not covered by the map, activate the text display 24 to inform the user that the current position is off the map and return to the main routine, otherwise continue.

C2 From Formula 2 and the stored data, calculate the map position (x, y) and store it in the RAM 34.

C3 From the stored data, convert the style of the map position to (X, Y) and store it in the RAM 34.

C4 Calculate a fractional part ($f_x$, $f_y$) of the map position within the grid block (X, Y) and store it in the RAM 34.

C5 Activate the text display 24 to inform the user of the name of the map and the stored map position (X, Y).

C6 Activate that pixel 38 of the graphical display 26 corresponding to the stored fractional part ($f_x$, $f_y$) of the map position.

C7 Return to the main routine.

Multi Calculation Subroutine

M1 Set a counter C to 0.

M2 For each set s of the S sets of maps:-

M3 For each map m in the M maps of set s:-

M4 If, from Formulae 7 and 8 and the stored data, it is determined that the current position is not covered by that map m in that set s, jump to step M10.

M5 Increment the counter C.

M6 Store the name of map m in set s as $N_C$.

M7 From Formula 2 and the stored data, calculate the position ($x_C$, $y_C$) and store it in the RAM 34.

M8 From the stored data, convert the style of the map position to ($X_C$, $Y_C$) and store it in the RAM 34.

M9 If C=1, calculate the fractional part ($f_x$, $f_y$) of the map position within the grid block ($X_1$, $Y_1$) and store it in the RAM 34.

M10 Next m

M11 Next s

M12 Activate the text display 24 to inform the user of the name of the series of maps or atlas.

M13 For each map I from 1 to C:-

M14 Activate the text display 24 to inform the user of the name $N_i$ of the map.

M15 Activate the text display 24 to inform the user of the stored map position ($X_i$, $Y_i$).

M16 Next I.

M17 Activate that pixel 38 of the graphical display 26 corresponding to the stored fractional part ($f_x$, $f_y$) of the map position on map $N_1$.

M18 Return to the main routine.

Example Display

In the case of the position of the old UK Patent Office Building on the A-Z Master Atlas of Greater London, as mentioned above, an example of the display which might he produced is shown in FIG. 5. The top part of the text display 24 shows the name of the atlas. This is followed by the names of those maps (page numbers) which show that position and, for each page number, the grid block which contains that position. The example display assumes that the data which is read from the atlas contains the data for the large scale set of maps, then for the medium scale set of maps, and then for the small scale set of maps. The graphical display 26 shows the relative position within the grid block of the first map which is listed, i.e. within Block G 2 on Page 173.

Second Embodiment

Figure 6:
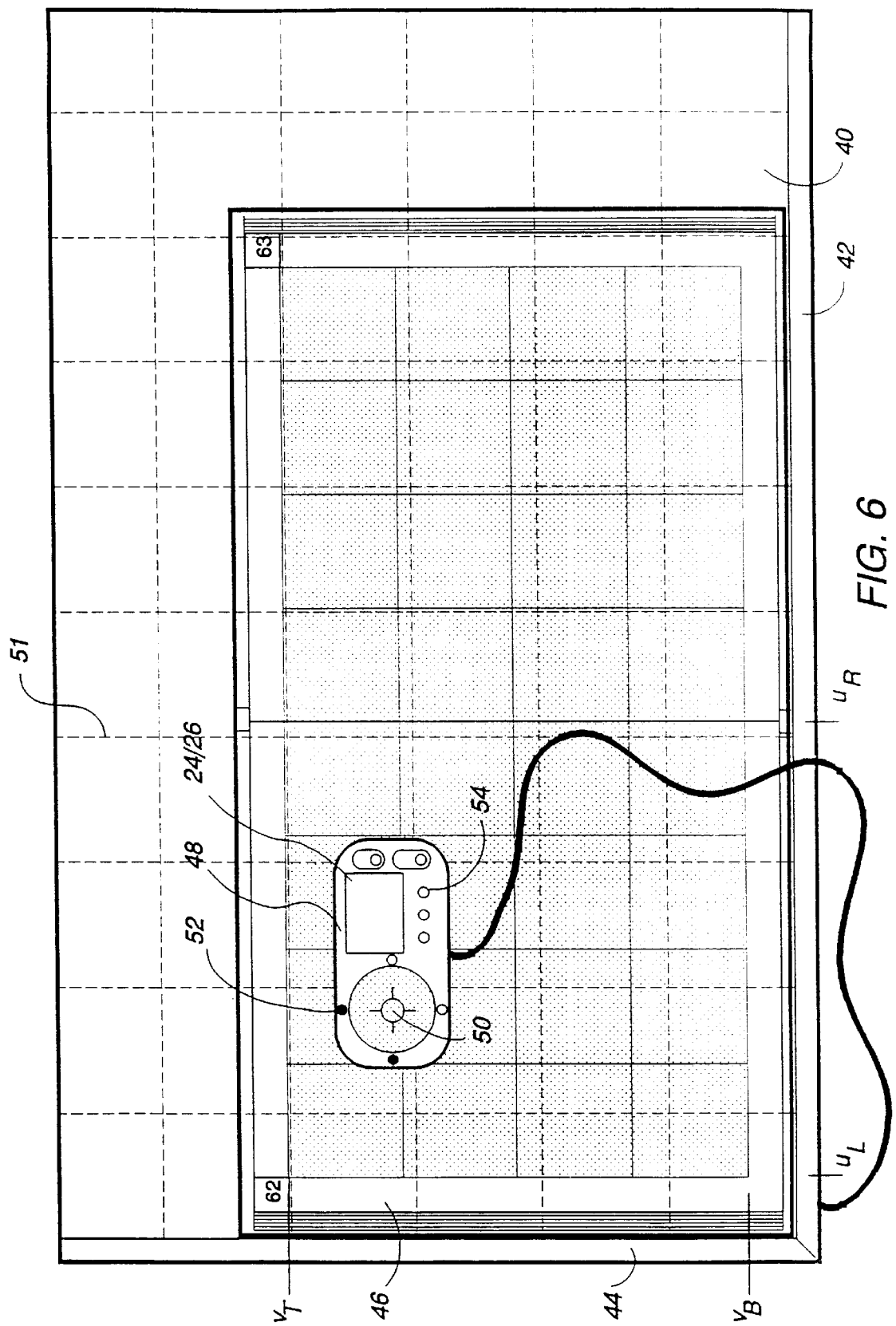
FIG. 6 is a top view of another embodiment of the apparatus.

FIG. 6 shows a second embodiment of the invention. A digitising tablet 40 has ledges 42, 44 along its bottom and left edges against which the bottom and left edges of a map or atlas 46 can be registered. A cursor 48 is movable over the atlas and incorporates many or all of the features of the apparatus 10 of FIG. 5. The cursor 48 and digitising tablet 40 co-operate in a known way so that the MPU 28 can determine the position of a reference point 50 of the cursor 48 with respect to the co-ordinate system of the digitising tablet 40, as denoted by dashed lines 51 in the drawing. In this embodiment, the data which is associated with the atlas also includes, for each map, information relating the co-ordinate system of that map with the co-ordinate system of the digitising tablet 40 when the atlas is registered with the ledges 42, 44 and the atlas is open at the map in question. For example, in addition to giving the co-ordinates $(x_L, y_B)$ and $(x_R, y_T)$ of two diagonally opposite corners of the map in terms of the map's co-ordinate system for boundary testing purposes, as described above, the data may also include the co-ordinates $(u_L, v_B)$ and $(u_R, v_T)$, as shown in FIG. 6, of those two corners in terms of the digitising tablet's co-ordinate system. Once the relationships between the three co-ordinate systems have been established, the MPU 28 can, for example, determine the direction in which the cursor should be moved so as to lie over a particular point, and indicate that direction by illuminating one or two of four lights 52 on the cursor. (For further information about this technique and modifications thereto, reference is directed to patent document WO-A-87/07013.) The particular point may be the current position, or it may be a target position which has been entered and stored in the RAM 34 by placing the cursor over that position on the map and pressing a push-button 54. Also, the MPU 28 can calculate the distance between the current position and the stored position, and the bearing of one with respect to the other, and display this information on the display 24.

Modifications and Developments

It will be appreciated that many modifications and developments may be made to the embodiments described above. For example, the apparatus may be simplified so that it deals with only one map, or only one page of an atlas, at a time, the data for that map or page being read from, for example, a bar code or magnetic stripe printed on the map or page.

In the arrangements described above, the data associated with the map(s) is machine-readable. Alternatively, the data may be provided as user-readable encoded text, and the apparatus may have a key pad or the like to enable a user to enter the encoded text, the text then being decoded by the MPU 28.

In the case where more than one map or atlas page covers a particular position, the apparatus may be arranged to display the details (including the position in the grid block on the graphical display 26) of only a selected one of the maps or pages, but with an indication that others are available. A push button may then be provided so that the user can cycle through the available details. Also, in the case where the map positions relate to different sets of the maps, and the selected map ceases to cover the current position, the MIPU 28 may be programed initially to select for display another map from the same series.

As described above, the graphical display 26 shows only the current relative position in the grid block. Alternatively, it may be arranged also to show previous positions so that a trail is built up as the user moves their position, with the current position displayed differently to the previous positions, for example blinding. In this case, a push button may be provided whose operation causes the previous positions to be cleared if the display becomes too cluttered.

The graphical display may be modified so that it is transparent and can be registered with the appropriate grid block of the map so as to show the current position in that grid block. In this case, the data which is associated with the map would include data from which the actual size of the grid blocks on the paper of the map can be determined.

In a simpler form of the apparatus, the graphical display may be omitted.

The apparatus may be modified so as to display the current position also in terms of latitude and longitude.

The data which is associated with each map may be encrypted, and the MPU 28 may he programmed to perform a suitable decryption algorithm so as to hinder the use of unauthorised data.

In the embodiment described above, the MPU 28 tests each of the maps in a predetermined order to determine which of the maps covers the current position. Once a map has been found which covers the current position, if that map then ceases to cover it, the current position should then be covered by a map covering an adjacent part of the earth's surface. Accordingly, the data provided for each map may also include information on the maps covering adjacent areas, and the MPU 28 may be programmed to use that information in order to increase the speed with which the next map may be found.

For maps drawn according to some cartographic projections, Formula 2 above based on a flat-earth model may not be appropriate. In order to deal with this, the MPU 28 may be programmed to be able to perform different transformation functions, for example for flat-earth, Mercator and transverse Mercator, and the data associated with each map or series of maps or atlas may include parameters defining the transformation function to be used for that map, or that series of maps or atlas, or for particular sets of maps in the series or atlas. Alternatively, the data may include the transformation function(s) itself, which is then loaded into the apparatus when the data is read.

The information which is provided so that the relationship between the wide-area co-ordinate system and the map's coordinate system need not be of the form described with reference to Formula 2 above. Instead, it may consist of the wide-area co-ordinates of a predetermined position on the map, the north direction on the map, and the scale of the map.

The apparatus need not include a GPS receiver, but instead may have an input to receive an output from a separate GPS receiver. Also, the apparatus may be built in to some other apparatus having other functions. Furthermore, the display may be separately housed, for example on the dashboard of a vehicle, whilst other parts of the apparatus are mounted elsewhere.

The invention may be put into effect by providing an accessory for a standard palm-top computer, such as a Psion Organiser. The accessory may comprise a GPS receiver connected to an interface card which may be inserted into one of the card slots of the palm-top computer. Accordingly, the computer, interface card and GPS receiver can perform the functions described above, with the display of the palm-top computer being used to provide both the text display 24 and the graphical display 26 described above.

It will be appreciated that many other modifications and developments may also be made and that the description above is not to be taken as limiting the scope of the invention.

What is claimed is:

1. A position indicating apparatus for use with a plurality of printed maps, the apparatus comprising:
   means for receiving a position indicating signal indicative of the geographical location of said apparatus;
   storage means for storing data associated with said maps which relates to the respective geographical areas covered by the respective maps of said plurality;
   processing means for processing said position indicating signal with said stored data for generating output data identifying which of said maps includes the geographical location indicated by said position indicating signal and identifying a portion of the identified map which contains said geographical location and wherein in the event that said geographical location is contained in a plurality of said maps, said processing means is operable to generate output data identifying the plurality of said maps which include the geographical location and identifying the portion of each of the identified maps which contains said geographical location; and
   output means for outputting to a user information corresponding to said output data for enabling the user to select the identified map or to select one of the identified maps and find the portion containing the geographical location on the selected map.

2. An apparatus according to claim 1, wherein said output means comprises a display for graphically displaying said information corresponding to said output data.

3. An apparatus according to claim 1, wherein each of said maps is divided into a plurality of grid blocks which are referenced by a respective grid reference, and wherein said processing means is operable to identify the portion of each of the maps by identifying the respective grid reference and thereby an identified one of the grid blocks that contains said geographical location.

4. An apparatus according to claim 3, wherein said processing means is operable to generate further output data indicative of the position of said geographical location and wherein said apparatus further comprises (i) user input means for allowing user selection of one of said maps in case said geographical location is contained in a plurality of said maps; and (ii) second output means, responsive to user selection, for outputting to the user information corresponding to said further output data for the selected one of the maps, for enabling the user to find said geographical location within an identified one of the grid blocks of the selected one of said maps.

5. An apparatus according to claim 4, wherein said second output means comprises a display for providing a visual indication of said geographical location within the identified grid block of the selected one of the maps.

6. An apparatus according to claim 5, wherein said geographical location within the identified grid block is indicated within said display by a moveable indicator which is responsive to the further output data for the selected map.

7. An apparatus according to claim 5, wherein said second output means is operable to display previous positions within the identified grid block of the selected one of the maps.

8. An apparatus according to claim 4, wherein said input means comprises a push button which allows a user to cycle through each of said identified maps.

9. An apparatus according to claim 4, for use with maps which are not all to the same scale and for use with conversion data which takes into account the different scales of the maps, wherein said processing means is operable to take into account the scale of the maps in generating said further output data.

10. A position indicating apparatus according to claim 9, wherein said data relating to the respective geographical areas covered by the respective maps of said plurality includes data relating to the cartographic projection of each of the maps.

11. An apparatus according to claim 1, wherein said receiving means is operable to receive signals from a positioning system in terms of a wide area coordinate system, wherein said storage means is operable to store conversion data relating said wide area coordinate system to a map coordinate system or systems of said plurality of maps and wherein said processing means is operable for generating said output data using said conversion data, which output data is in terms of the map coordinate system of the identified map or maps.

12. An apparatus according to claim 1, further comprising means for receiving said data relating to the respective geographical areas covered by the respective maps of said plurality.

13. A position indicating apparatus according to claim 12, wherein said data relating to the respective geographical areas covered by the respective maps of said plurality is machine-readable and the data receiving means comprises means for reading the machine-readable data.

14. A position indicating apparatus according to claim 9, wherein said data relating to the respective geographical areas covered by the respective maps of said plurality includes data relating to the cartographic projection of each of the maps.

15. An apparatus according to claim 1, wherein each map is formed on a respective printed map sheet.

16. A position indicating apparatus according to claim 15, further comprising:
   a digitizing surface having:
      means for registering a selected one of the printed map sheets with respect to the digitizing surface;
      a cursor which is moveable with respect to the registered map sheet; and
      means for determining the position of the cursor with respect to the digitizing surface.

17. A position indicating apparatus according to claim 16, wherein said output means is operable to indicate a required direction of movement of the cursor towards said geographical location on a selected one of the printed map sheets.

18. A position indicating apparatus according to claim 1, wherein said storage means is also operable to store a target geographical location, wherein said processing means is also operable to calculate a distance between the stored geographical location and the current geographical location and wherein said output means is also operable to output the calculated distance.

19. A position indicating apparatus according to claim 1, wherein said storage means is also operable to store a target geographical location, wherein said processing means is also operable to calculate a bearing of the stored and current geographical location relative to each other and wherein said output means is also operable to output the calculated bearing.

20. In combination, a plurality of predetermined printed map sheets in combination with a position indicating apparatus according to claim 1 adapted for use with said predetermined printed map sheets.

21. A method of indicating a position of a user on at least one of a plurality of maps using a position indicating apparatus, the method comprising the steps of:
receiving a position indicating signal indicative of the geographical location of said apparatus;
storing data associated with said maps which relates to the respective geographical areas covered by the respective maps of said plurality;
processing said position indicating signal with said stored data to generate output data identifying which of said maps includes the geographical location indicated by said position indicating signal and identifying the portion of the identified map sheet which contains said geographical location and wherein in case said geographical location is contained in a plurality of said maps, generating output data identifying the plurality of said maps which include the geographical location and identifying the portion of each of the identified maps which contains said geographical location; and
outputting to a user information corresponding to said output data for enabling the user to select the identified map or to select one of the identified maps and to find the portion containing the geographical location on the selected map.

22. A method according to claim 21, wherein said outputting step uses a display for graphically displaying said information corresponding to said output data.

23. A method according to claim 21, wherein each of said maps is divided into a plurality of grid blocks which are referenced by a respective grid reference, and wherein said processing step identifies the portion of the or each map by identifying the grid reference and thereby the grid block that contains said geographical location.

24. A method according to claim 23, wherein said processing step generates further output data indicative of the position of said geographical location, wherein said method further comprises allowing user selection of one of said identified maps via a user input means in case said geographical location is contained in a plurality of said maps and wherein said method further comprises a second output step responsive to said user selection, for outputting to the user information corresponding to said further output data for the selected map, for enabling the user to find said geographical location within the identified grid block of the selected map.

25. A method according to claim 24, wherein said second output step uses a display to provide a visual indication of said geographical location within the identified grid block of the selected map.

26. A method according to claim 25, wherein said second output step uses a moveable indicator which is responsive to the further output data for the selected one of the maps to indicate within said display said geographical location within the identified grid block.

27. A method according to claim 25, wherein said second output step displays previous positions within the identified grid block of the selected map.

28. A method according to claim 24, wherein said maps are not all to the same scale, wherein said storing step stores conversion data which takes into account the different scales of the maps, and wherein said processing step takes into account the scale of the maps in generating said further output data.

29. A method according to claim 21, wherein said receiving step receives signals from a positioning system in terms of a wide area coordinate system, wherein said storing step stores conversion data relating said wide area coordinate system to the coordinate system or systems of said plurality of maps and wherein said processing step generates said output data using said conversion data, which output data is in terms of the map coordinate system of the identified map or maps.

30. A method according to claim 21, further comprising the step of receiving said data relating to the respective geographical areas covered by the respective maps of said plurality.

31. A method according to claim 30, wherein said data relating to the respective geographical areas covered by the respective maps of said plurality is machine-readable and the data receiving step comprises the step of reading the machine-readable data using a data reading device.

32. A method according to claim 30, wherein said storing step stores data relating to the cartographic projection of each map.

33. A method according to claim 21, further comprising the step of receiving signals from a wide area position transmitting system and the step of determining therefrom said position indicating signal indicative of the geographical location of said apparatus.

34. A method according to claim 21, wherein said storing step stores a target geographical location, wherein said processing step calculates a distance between the stored geographical location and the current geographical location and wherein said output step outputs the calculated distance.

35. A method according to claim 21, wherein said storing step stores a target geographical location, wherein said processing step calculates a bearing of the stored and current geographical location relative to each other and wherein said output step outputs the calculated bearing.

36. A position indicating apparatus for use with a plurality of printed maps, the apparatus comprising:
a receiver operable to receive a position indicating signal indicative of the geographical location of said apparatus;
a memory for storing data associated with said maps which relates to the respective geographical areas covered by the respective maps of said plurality;
a processor for processing said position indicating signal with said stored data for generating output data identifying which of said maps includes the geographical location indicated by said position indicating signal and identifying a portion of the identified map which contains said geographical location and wherein in the event that said geographical location is contained in a plurality of said maps, said processor being operable to generate output data identifying the plurality of said maps which include the geographical location and identifying the portion of each of the identified maps which contains said geographical location; and
an output circuit for outputting to a user information corresponding to said output data for enabling the user to select the identified map or to select one of the identified maps and find the portion containing the geographical location on the selected map.

37. An apparatus according to claim 36, wherein said output circuit comprises a display for graphically displaying said information corresponding to said output data.

38. An apparatus according to claim 36, wherein each of said maps is divided into a plurality of grid blocks which are referenced by a respective grid reference, and wherein said processor is operable to identify the portion of each of the maps by identifying the grid reference and thereby the grid block that contains said geographical location.

39. An apparatus according to claim 38, wherein said processor is operable to generate further output data indicative of the position of said geographical location and wherein said apparatus further comprises (i) a user interface for allowing user selection of one of said identified maps in the event that said geographical location is contained in a plurality of said maps; and (ii) a second output circuit, responsive to said user selection, for outputting to the user information corresponding to said further output data for the selected map, for enabling the user to find said geographical location within the identified grid block of the selected map.

40. An apparatus according to claim 39, wherein said second output circuit comprises a display for providing a visual indication of said geographical location within the identified grid block of the selected map.

41. An apparatus according to claim 40, wherein said geographical location within the identified grid block is indicated within said display by a moveable indicator which is responsive to the further output data for the selected map.

42. An apparatus according to claim 40, wherein said second output circuit is operable to display previous positions of said apparatus within the identified grid block of the selected map.

43. An apparatus according to claim 39, wherein said user interface comprises a push button which allows a user to cycle through each of said identified maps.

44. An apparatus according to claim 39, for use with maps which are not all to the same scale and for use with conversion data which takes into account the different scales of the maps, wherein said processor is operable to take into account the scale of the maps in generating said further output data.

45. A position indicating apparatus according to claim 44, wherein said data relating to the respective geographical areas covered by the respective maps of said plurality includes data relating to the cartographic projection of each map.

46. An apparatus according to claim 36, wherein said receiver is operable to receive signals from a positioning system in terms of a wide area coordinate system, wherein said memory is operable to store conversion data relating said wide area coordinate system to the map coordinate system or systems of said plurality of maps and wherein said processor is operable for generating said output data using said conversion data, which output data is in terms of the map coordinate system of the identified map or maps.

47. An apparatus according to claim 36, further comprising a second receiver for receiving said data relating to the respective geographical areas covered by the respective maps of said plurality.

48. A position indicating apparatus according to claim 47, wherein said data relating to the respective geographical areas covered by the respective maps of said plurality is machine-readable and the second receiver comprises means for reading the machine-readable data.

49. A position indicating apparatus according to claim 36, further comprising a second receiver for receiving signals from a wide area position transmitting system and means for determining therefrom said position indicating signal indicative of the geographical location of said apparatus.

50. An apparatus according to claim 36, wherein each map is formed on a printed map sheet.

51. A position indicating apparatus according to claim 50, further comprising:
a digitizing surface having:
means for registering the selected map sheet with respect to the digitizing surface;
a cursor which is moveable with respect to the registered map sheet; and
a processor for determining the position of the cursor with respect to the digitizing surface.

52. A position indicating apparatus according to claim 51, wherein said output circuit is operable to indicate a required direction of movement of the cursor towards said geographical location on the selected one of the map sheets.

53. A position indicating apparatus according to claim 36, wherein said memory is also operable to store a target geographical location, wherein said processor is also operable to calculate a distance between the stored geographical location and the current geographical location and wherein said output circuit is also operable to output the calculated distance.

54. A position indicating apparatus according to claim 36, wherein said memory is also operable to store a target geographical location, wherein said processor is also operable to calculate a bearing of the stored and current geographical location relative to each other and wherein said output circuit is also operable output the calculated bearing.

* * * * *